United States Patent
Huang

(10) Patent No.: US 8,286,930 B2
(45) Date of Patent: Oct. 16, 2012

(54) ANGLE-ADJUSTABLE DISPLAY WITH ADJUSTING UNIT RELATED TO BODY OF DISPLAY IN SHAPE

(75) Inventor: Wen-Hung Huang, Taipei County (TW)

(73) Assignee: Hannspree, Inc., Taipei (TW)

( * ) Notice: Subject to any disclaimer, the term of this patent is extended or adjusted under 35 U.S.C. 154(b) by 434 days.

(21) Appl. No.: 12/556,446

(22) Filed: Sep. 9, 2009

(65) Prior Publication Data

US 2011/0036962 A1    Feb. 17, 2011

(30) Foreign Application Priority Data

Aug. 12, 2009    (TW) ................................ 98127143 A

(51) Int. Cl.
*F16M 1/00*    (2006.01)

(52) U.S. Cl. .......................... 248/370; 248/923; 248/462

(58) Field of Classification Search .................. 248/450, 248/460, 462, 444, 454, 917–923, 455, 456, 248/370, 127, 146, 346.01, 346.03, 346.07
See application file for complete search history.

(56) References Cited

U.S. PATENT DOCUMENTS

| | | | |
|---|---|---|---|
| 6,899,311 B1 * | 5/2005 | Ternus | 248/454 |
| 7,159,771 B2 * | 1/2007 | Singgih et al. | 235/383 |
| 7,467,773 B2 * | 12/2008 | Ogawa et al. | 248/472 |
| 7,922,133 B2 * | 4/2011 | Hsu | 248/127 |
| 8,038,117 B2 * | 10/2011 | Chen et al. | 248/677 |
| 2006/0049327 A1 * | 3/2006 | Chen | 248/371 |
| 2006/0237623 A1 * | 10/2006 | Sung | 248/688 |
| 2007/0235626 A1 * | 10/2007 | Mamizuka et al. | 248/677 |

* cited by examiner

*Primary Examiner* — Terrell McKinnon
*Assistant Examiner* — Steven Marsh
(74) *Attorney, Agent, or Firm* — C. G. Mersereau; Nikolai & Mersereau, P.A.

(57) ABSTRACT

The invention provides an angle-adjustable display with an adjusting unit related to a body of the display in shape. The angle-adjustable display comprises a display body, a connecting rod and an adjusting unit. The connecting rod, at each of its two ends, respectively connects to the display and the adjusting unit. As the adjusting unit rotates along a rotating axis of the connecting rod as a rotation shaft, the adjusting unit contacts a surface in a contact position. A distance between the rotating axis and the surface is variable by rotating the adjusting unit along the rotating axis, and would change in the rotation of the display body, and the inclination of the display can be adjusted by rotating the adjusting unit along the rotating axis to change the contact position in opposition to the surface.

9 Claims, 8 Drawing Sheets

ANGLE-ADJUSTABLE DISPLAY WITH ADJUSTING UNIT RELATED TO BODY OF DISPLAY IN SHAPE

FIELD OF THE INVENTION

The present invention relates to a display, and in particular to an angle-adjustable display with an adjusting unit related to a body of the display in shape.

BACKGROUND OF THE INVENTION

Presently, a conventional display includes a display body, a support bracket, and a fulcrum apparatus disposed between and connecting the display body and the support bracket. There are two types of support brackets for conventional displays, one of which is disposed on the bottom of the display body. In this type of support bracket, the display body stands above a surface of the desk rather than contacting the surface directly. The other type is a simple support bracket disposed on the rear side of the display body. In this type of simple support bracket, the bottom of the display body lays on the desk surface directly, and the rest of the body leans on the simple support bracket.

In the foresaid simple support bracket, the fulcrum apparatus is utilized to adjust the included angle between the simple support bracket and the display body and to change the inclination angle of the display. Furthermore, the fulcrum apparatus obtains a holding torque by closely integrating rings, washers, etc., and these numerous and complicated elements of the support bracket increase its size and raise its manufacturing cost and time as well as complicating the fabrication process.

In light of the drawbacks of the conventional display, the inventor with many years of experience in related industry develops an angle-adjustable display with an adjusting unit related to the body of the display in shape.

SUMMARY OF THE INVENTION

An objective of the present invention is to provide an angle-adjustable display with an adjusting unit related to a body of the display in shape to adjust the inclination angle of the display.

In order to achieve the foregoing objectives, the invention provides an angle-adjustable display with an adjusting unit related to a body of the display in shape, which comprises a display body, a connecting rod and an adjusting unit. The connecting rod, at each of its two ends, respectively connects to the display and the adjusting unit. The adjusting unit rotates along a rotating axis of the connecting rod as a rotation shaft, in order to change its contact position differently in opposition to a surface. A distance between the rotating axis and the surface is variable by rotating the adjusting unit along the rotating axis and would change in the rotation of the display body, and the inclination of the display body can be adjusted by rotating the adjusting unit along the rotating axis.

As mentioned above, the angle-adjustable display according to the present invention includes several advantages as follows:
(a) The inclination of the display body can be adjusted by rotating the adjusting unit.
(b) The display body and the adjusting unit are in shapes of similar design concepts, such as vegetables, fruits, balls or animals, etc., in order to attract consumers.

DETAILED DESCRIPTION OF THE INVENTION

The techniques employed by the present invention to achieve the foregoing objectives and the effects thereof are described hereinafter by way of examples with reference to the accompanying drawings, and the same components in following embodiments are labeled in same number to simplify the description.

Figure 1:
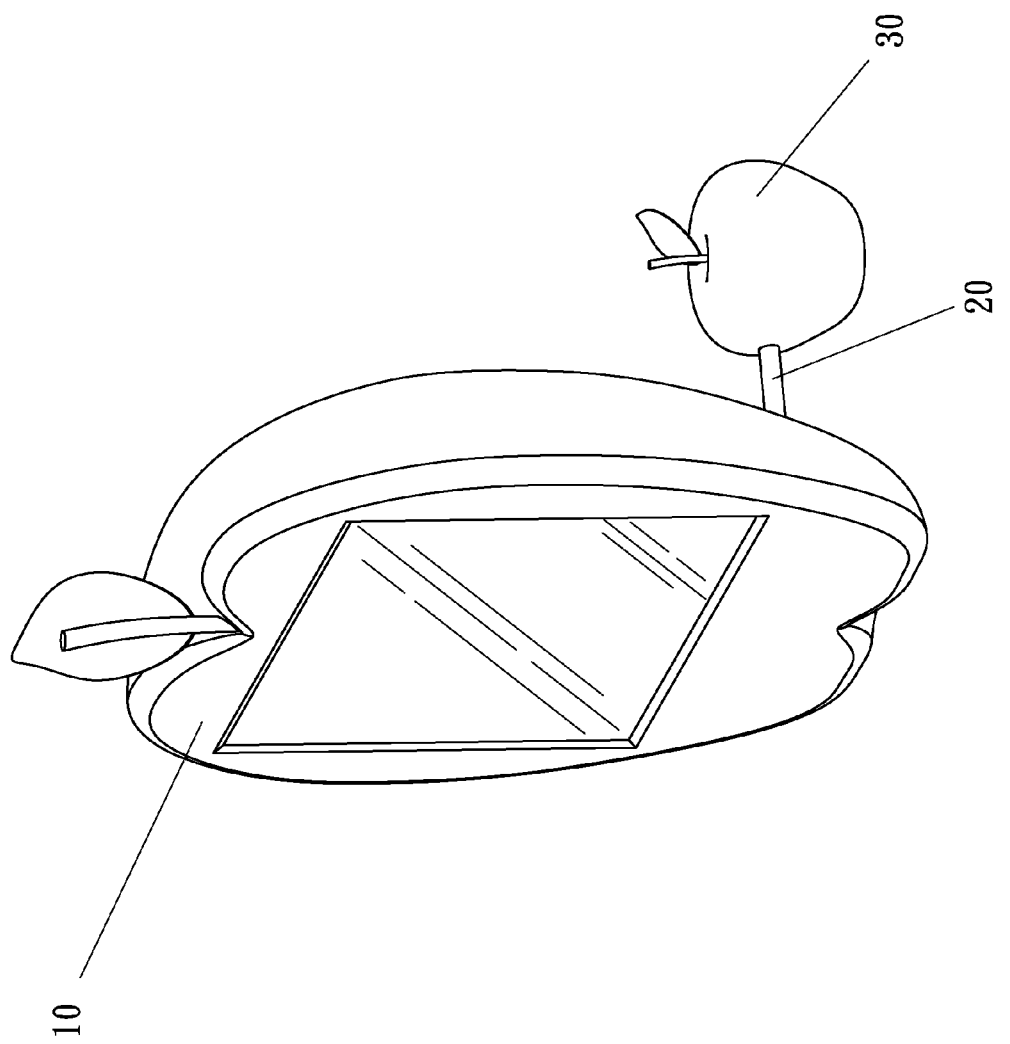
FIG. 1 is a schematic view showing an angle-adjustable display with an adjusting unit related to a body of the display in shape according to a preferred embodiment of the present invention.

FIG. 1 is a schematic view showing on angle-adjustable display with an adjusting unit related to a display body in shape according to a preferred embodiment of the present invention. Referring to FIG. 1, the angle-adjustable display comprises a display body (10), a connecting rod (20) and an adjusting unit (30). The display body (10) and the adjusting unit (30) are placed on a flat surface (40) and are connected by two ends, including the first end and the second end, of the connecting rod (20). The adjusting unit (30) rotates along a rotating axis of the connecting rod (20) as a rotation shaft in order to change its contact position differently in opposition to the surface (40), and the display body (10) and the adjusting unit (30) are in related shapes, such as fruits, vegetables, balls or animals. For instance, the outer shape of the display body (10) can be a dog's head with the shape of the adjusting unit (30) similar to a dog's tail. In this embodiment the shape is an apple, but it should not be construed as a limitation on the actual applicable scope of the invention.

Figure 2:
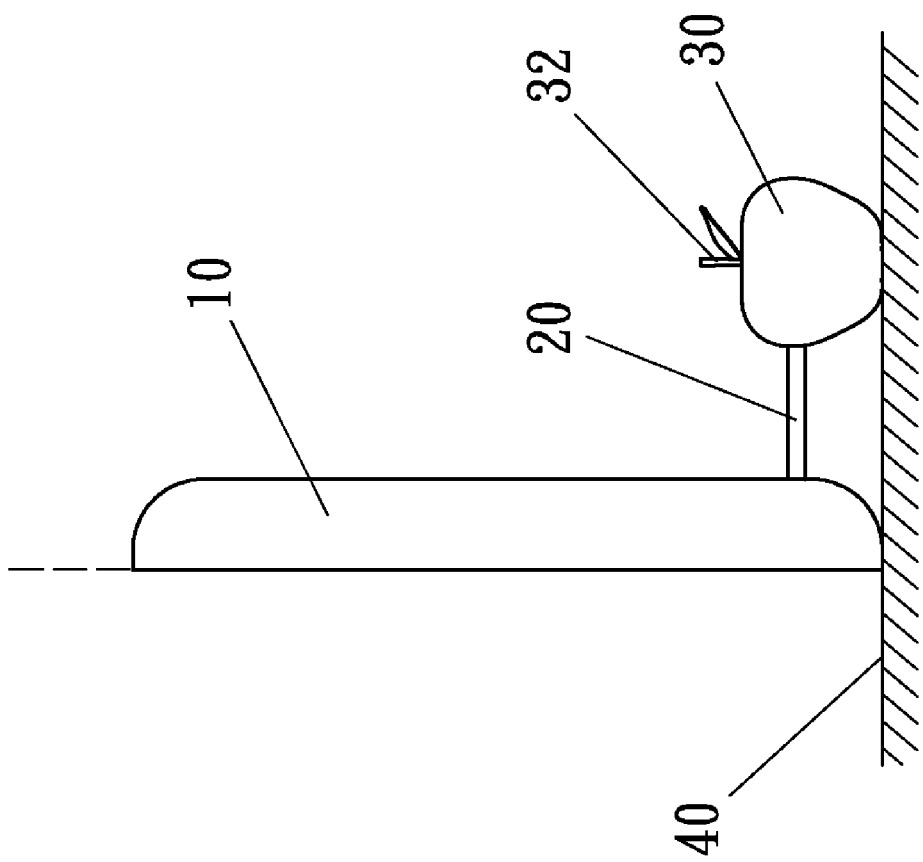
FIG. 2 is a schematic view showing an example of the angle-adjustable display according to a preferred embodiment of the present invention.
Figure 3:
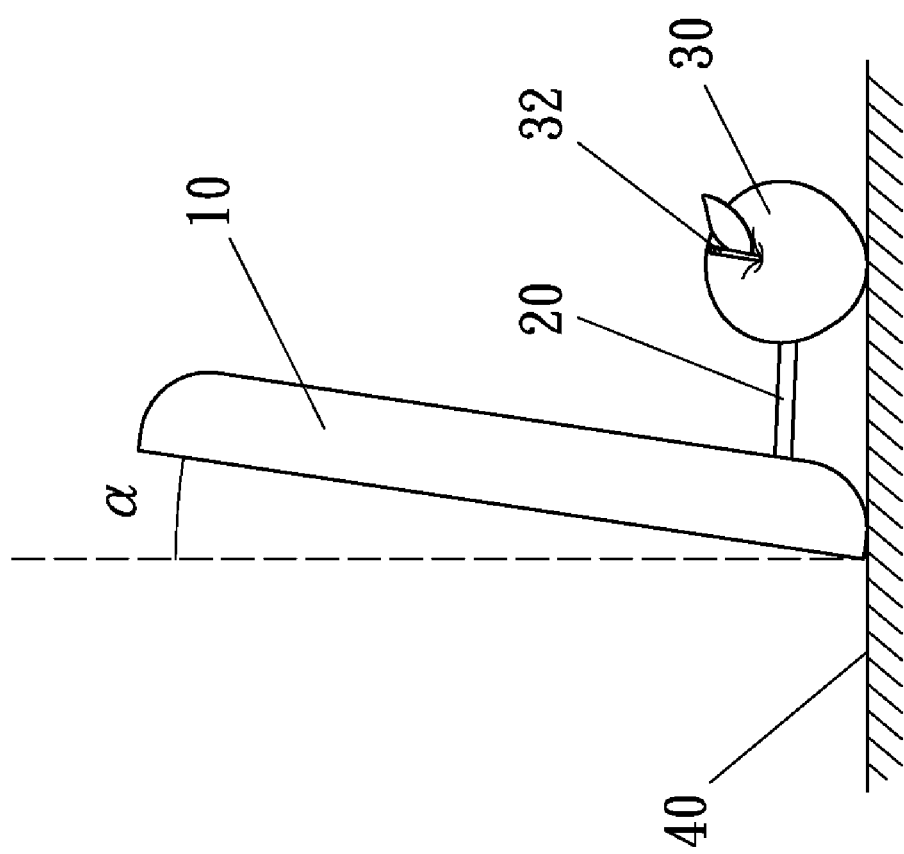
FIG. 3 is a schematic view showing another example of the angle-adjustable display according to a preferred embodiment of the present invention.
Figure 4:
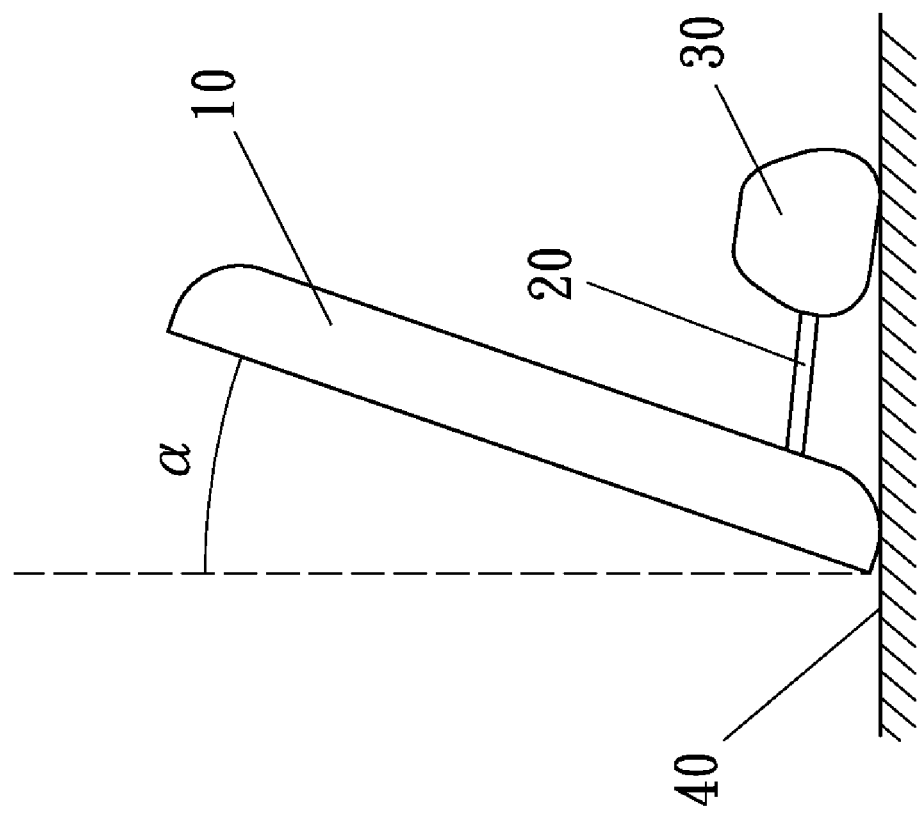
FIG. 4 is a schematic view showing still another example of the angle-adjustable display according to a preferred embodiment of the present invention.
Figure 5:
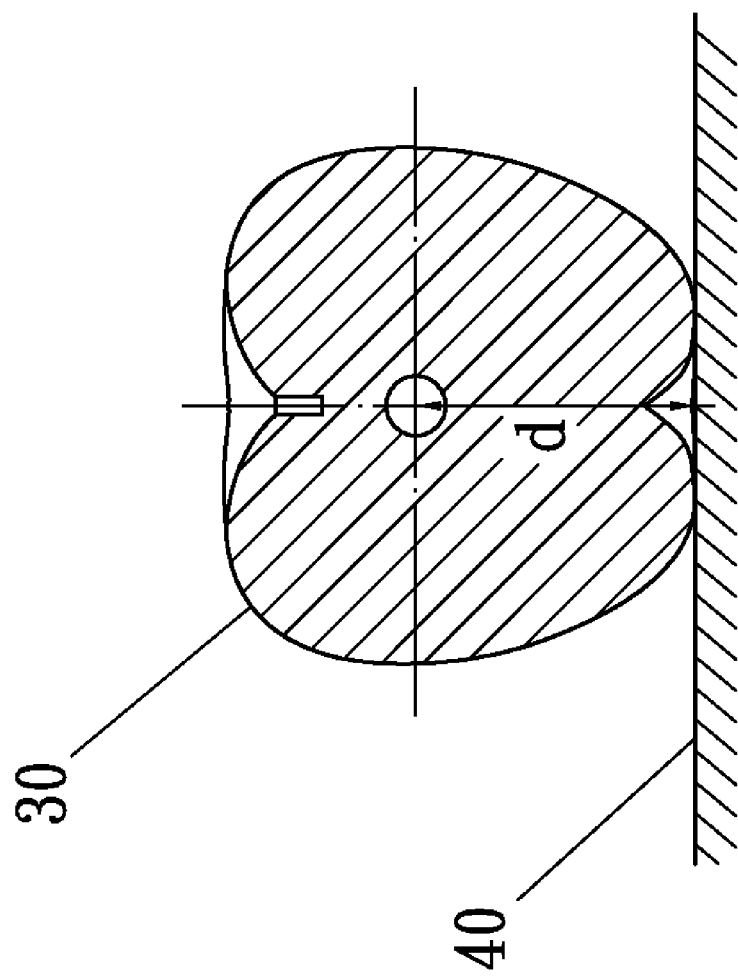
FIG. 5 is a cross-sectional view showing the adjusting unit according to a preferred embodiment of the present invention.
Figure 6:
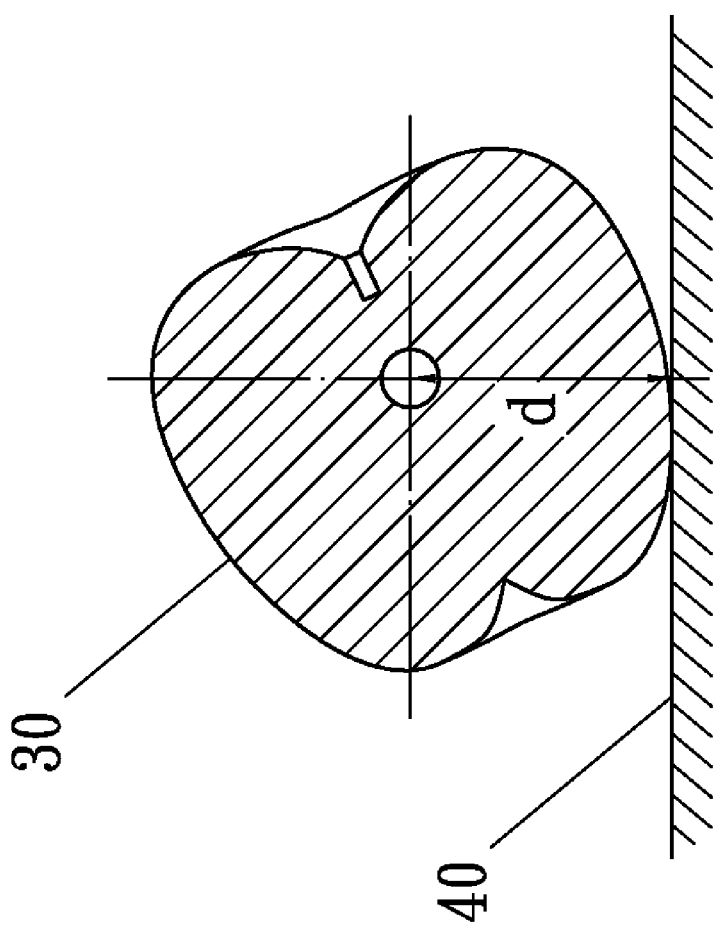
FIG. 6 is another cross-sectional view showing the adjusting unit according to a preferred embodiment of the present invention.
Figure 7:
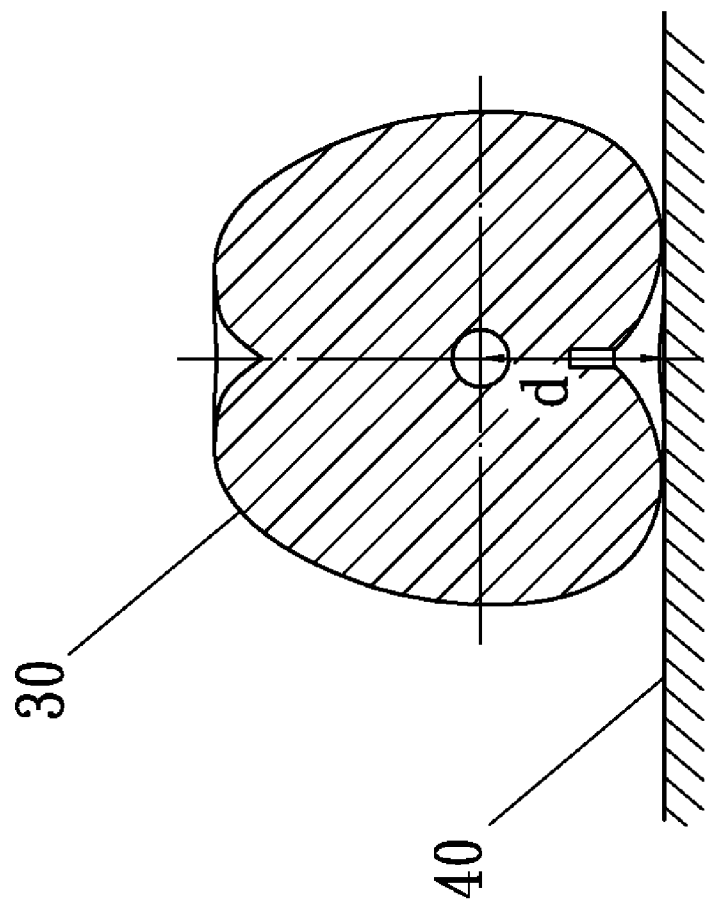
FIG. 7 is still another sectional drawing showing the adjusting unit according to a preferred embodiment of the present invention.

FIG. 2, FIG. 3 and FIG. 4 are schematic views showing examples of the angle-adjustable display according to preferred embodiments of the present invention. Referring to FIG. 2 to FIG. 4, when the adjusting unit (30) connects to the connecting rod (20), they are two ways to perform the adjustment of the display. In one way, the adjusting unit (30) rotates in opposition to the connecting rod (20), and in the other, the connecting rod (20) rotates in opposition to the display (10). In this embodiment, the connecting rod (20) rotates in opposition to the display (10) and leads the adjusting unit (30) to rotate. A distance between the rotating axis of the connecting rod (20) and the surface (40) is variable by rotating the adjusting unit along the rotating axis (as shown in FIG. 5 to FIG. 7), so the inclination angle ($\alpha$) of the display body (10) can be adjusted by rotating the adjusting unit (30) to change the vertical distance (d) to the surface (40). Hence, the user may adjust the inclination angle ($\alpha$) of the display body (10) by rotating the connecting rod (20) or the adjusting unit (30) to change the contact position. As mentioned above, the adjusting unit (30) is in a shape of an apple, which includes a detachable apple stalk (32). Consequently, in the configuration of the adjusting unit (30) as shown in FIG. 4, the apple stalk (32) can be detached to avoid disturbing balance.

Figure 8:
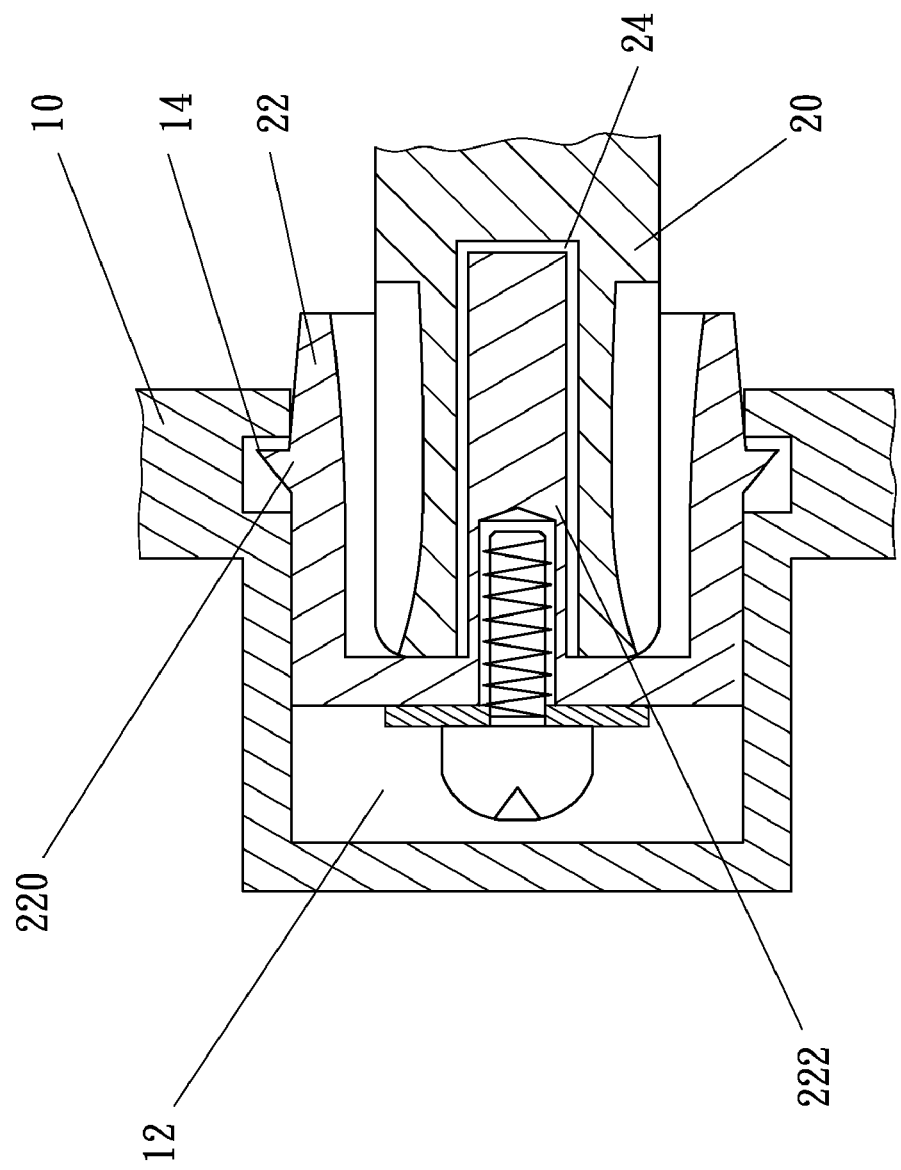
FIG. 8 is a partial schematic view showing an assembly structure of the display body and the adjusting unit according to a preferred embodiment of the present invention.

FIG. 8 is a partial schematic view showing an assembly structure of the display body and the adjusting unit according to a preferred embodiment of the present invention. Referring to FIG. 8, the display body (10) includes a first recess (12) corresponding to the first end of the connecting rod (20). The inner surface of the first recess (12) further comprises a second recess (14), and the first end of the connecting rod (20), which connects to the display body (10), further comprises a retaining cover (22) corresponding to the first recess (12). Moreover, the external surface of the retaining cover (22) further comprises a hook (220), so the hook (220) hooks and engages to the second recess (14) to provide a closer combination the connecting rod (20) to the display body (10) when the retaining cover (22) fits in the first recess (12). The first end of the connecting rod (20) includes a shaft bore (24), and the retaining cover (22) includes an axle bar (222) corresponding to the shaft bore (24). The connecting rod (20) rotates around the axle bar (222) as a rotation shaft.

The preferred embodiments of the present invention have been disclosed in the examples. However the examples should not be construed as a limitation on the actual applicable scope of the invention, and as such, all modifications and alterations without departing from the spirits of the invention and appended claims shall remain within the protected scope and claims of the invention.

What is claimed is:

1. An angle-adjustable display with an adjusting unit related to a body of the display in shape, the angle-adjustable display comprising:
a display body including a bottom contacting to a surface;
a connecting rod including a first end and a second end, the first end connecting to the display body; and
an adjusting unit contacting the surface in a contact position and connecting to the second end of the connecting rod, the adjusting unit rotating along a rotating axis of the connecting rod, as a rotation shaft, to change the contact position,
wherein a distance between the rotating axis and the surface is variable by rotating the adjusting unit along the rotating axis, and an inclination angle of the display body is adjustable by rotating the adjusting unit along the rotating axis to change the contact position in opposition to the surface.

2. The angle-adjustable display according to claim 1, wherein the adjusting unit is in a shape of a fruit.

3. The angle-adjustable display according to claim 2, wherein the display body is in a related shape of the fruit.

4. The angle-adjustable display according to claim 1, wherein the adjusting unit rotates in opposition to the connecting rod.

5. The angle-adjustable display according to claim 1, wherein the connecting rod rotates in opposition to the display body and leads the adjusting unit to rotate.

6. The angle-adjustable display according to claim 5, wherein the display body connects to the connecting rod by hooking and engaging.

7. The angle-adjustable display according to claim 6, wherein the first end of the connecting rod includes a retaining cover, and the display body includes a first recess corresponding to the retaining cover.

8. The angle-adjustable display according to claim 7, wherein an inner surface of the first recess further includes a second recess, and an external surface of the retaining cover forms a hook corresponding to the second recess.

9. The angle-adjustable display according to claim 8, wherein the first end of the connecting rod further includes a shaft bore, and the retaining cover includes an axle bar corresponding to the shaft bore.

* * * * *